United States Patent
Piepenbrink et al.

(10) Patent No.: US 12,028,581 B2
(45) Date of Patent: *Jul. 2, 2024

(54) METHOD OF PROVIDING PERSONALIZED CHANNEL CHANGE LISTS

(71) Applicant: AT&T Intellectual Property I, L.P., Atlanta, GA (US)

(72) Inventors: David Piepenbrink, Denver, CO (US); Stephen Rys, Bainbridge Island, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,246

(22) Filed: Feb. 15, 2023

(65) Prior Publication Data

US 2023/0199261 A1 Jun. 22, 2023

Related U.S. Application Data (63) Continuation of application No. 15/624,512, filed on Jun. 15, 2017, now Pat. No. 11,606,621.

(51) Int. Cl.
*H04N 21/482* (2011.01)
*H04N 21/258* (2011.01)
*H04N 21/462* (2011.01)

(52) U.S. Cl.
CPC ..... *H04N 21/482* (2013.01); *H04N 21/25841* (2013.01); *H04N 21/25891* (2013.01); *H04N 21/462* (2013.01)

(58) Field of Classification Search
CPC .................. H04N 21/482; H04N 21/25841
See application file for complete search history.

(56) References Cited

U.S. PATENT DOCUMENTS

| | | | |
|---|---|---|---|
| 5,585,866 A | 12/1996 | Miller et al. | |
| 5,594,509 A | 1/1997 | Florin et al. | |

(Continued)

FOREIGN PATENT DOCUMENTS

| | | |
|---|---|---|
| CN | 105187902 A | 12/2015 |
| KR | 101115956 B1 | 2/2012 |

(Continued)

OTHER PUBLICATIONS

Dish Network, "Favorites Lists: Chapter 5 Creating or Changing Favorites Lists", dishnetwork.com, Sep. 22, 2010.

(Continued)

*Primary Examiner* — Frank Johnson
(74) *Attorney, Agent, or Firm* — Guntin & Gust, PLC; Mark Wilinski (57) ABSTRACT

A method can be provided which includes receiving a channel line-up for an over-the-top media content system, receiving a preferred channel line-up containing a portion of the channel line-up, displaying individual channels of the channels of the preferred channel line-up in a preferred order on a display associated with the processor, monitoring a location of the processor while displaying the preferred channel line-up, determining whether the location of the processor corresponds to a channel exclusion zone, and removing excluded channels from the channel line-up based on the channel exclusion zone. Other embodiments are disclosed.

20 Claims, 6 Drawing Sheets

(56) References Cited

U.S. PATENT DOCUMENTS

| | | |
|---|---|---|
| 5,801,747 A | 9/1998 | Bedard |
| 5,886,746 A | 3/1999 | Leung et al. |
| 6,198,513 B1 | 3/2001 | Cherrick et al. |
| 6,262,722 B1 | 7/2001 | Allison et al. |
| 6,438,752 B1 | 8/2002 | McClard et al. |
| 6,493,688 B1 | 12/2002 | Das et al. |
| 7,013,478 B1 | 3/2006 | Hendricks et al. |
| 7,352,414 B2 | 4/2008 | Lee |
| 7,617,511 B2 | 11/2009 | Marsh et al. |
| 8,020,189 B2 | 9/2011 | Kim et al. |
| 8,205,228 B2 | 6/2012 | Han et al. |
| 8,401,566 B2 | 3/2013 | Lee et al. |
| 8,499,319 B2 | 7/2013 | Lee et al. |
| 8,621,517 B2 | 12/2013 | Hackson et al. |
| 8,782,685 B1 | 7/2014 | Chao et al. |
| 8,924,999 B1 | 12/2014 | Santangelo et al. |
| 9,569,009 B2 | 2/2017 | Kamen et al. |
| 9,900,401 B2 | 2/2018 | Hasek |
| 2002/0023010 A1 | 2/2002 | Rittmaster et al. |
| 2004/0172651 A1 | 9/2004 | Wasilewski et al. |
| 2005/0198666 A1 | 9/2005 | Hsieh et al. |
| 2006/0015903 A1* | 1/2006 | MacBeth ............... H04N 7/163 725/39 |
| 2006/0168610 A1* | 7/2006 | Noil Williams ....... H04N 7/163 725/9 |
| 2006/0215990 A1 | 9/2006 | Proebstel |
| 2007/0186231 A1 | 8/2007 | Haeuser et al. |
| 2007/0199040 A1 | 8/2007 | Kates et al. |
| 2007/0240179 A1 | 10/2007 | Lavigne et al. |
| 2007/0300259 A1 | 12/2007 | Chan et al. |
| 2008/0066103 A1 | 3/2008 | Ellis et al. |
| 2008/0311952 A1 | 12/2008 | Sugiyama |
| 2009/0150959 A1 | 6/2009 | Jerding et al. |
| 2010/0310237 A1 | 12/2010 | Hill et al. |
| 2011/0016485 A1 | 1/2011 | Hubner et al. |
| 2011/0239253 A1 | 9/2011 | West et al. |
| 2012/0117026 A1 | 5/2012 | Cassidy |
| 2012/0124613 A1 | 5/2012 | Reddy et al. |
| 2012/0314088 A1 | 12/2012 | Li et al. |
| 2013/0174201 A1 | 7/2013 | Tam |
| 2013/0276017 A1 | 10/2013 | Walker et al. |
| 2014/0068661 A1 | 3/2014 | Gates, III et al. |
| 2014/0078403 A1 | 3/2014 | Joslyn et al. |
| 2014/0130081 A1 | 5/2014 | Ozawa |
| 2014/0150025 A1 | 5/2014 | Pratt et al. |
| 2014/0298169 A1 | 10/2014 | Williams |
| 2015/0026734 A1 | 1/2015 | Ellis |
| 2015/0058880 A1 | 2/2015 | Earle |
| 2015/0067099 A1 | 3/2015 | Martin |
| 2015/0281744 A1 | 10/2015 | Chapman |
| 2016/0066021 A1 | 3/2016 | Thomas et al. |
| 2016/0094865 A1 | 3/2016 | Lee et al. |
| 2016/0191599 A1 | 6/2016 | Stridsman |
| 2017/0094363 A1 | 3/2017 | Miller et al. |
| 2017/0251336 A1 | 8/2017 | Keller |
| 2018/0310070 A1 | 10/2018 | Murray |
| 2018/0367859 A1 | 12/2018 | Piepenbrink et al. |

FOREIGN PATENT DOCUMENTS

| | | |
|---|---|---|
| KR | 101348646 B1 | 12/2013 |
| WO | 2006135148 A1 | 12/2006 |

OTHER PUBLICATIONS

Gracenote, "Favorite Channel Module", User Setup Guide; universalremote.com, Jun. 1-16, 2016.

Pineville Communication Systems, "Control the Remote", pinevilledsl.net, Nov. 1-2, 2015.

* cited by examiner

METHOD OF PROVIDING PERSONALIZED CHANNEL CHANGE LISTS

CROSS REFERENCE TO RELATED APPLICATIONS

This application is a continuation of U.S. patent application Ser. No. 15/624,512 filed on Jun. 15, 2017. All sections of the aforementioned application are incorporated herein by reference in their entirety.

FIELD OF THE DISCLOSURE

The subject disclosure relates to a system and method for providing personalized channel change lists to an over-the-top (OTT) media content system.

BACKGROUND

OTT media content systems can provide different channels of live streaming television channels similar to conventional broadcast television.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for customizing channels in an OTT media content delivery system. Conventionally, live channels in an OTT media content delivery system can only be selected by "swiping" through channels in alphabetical order. Exemplary embodiments of the present invention provide customizable channel lists for OTT media content delivery systems. Other embodiments are described in the subject disclosure.

One or more aspects of the subject disclosure include a method that includes receiving a channel line-up for an over-the-top media content system, receiving a preferred channel line-up containing a portion of the channel line-up, displaying individual channels of the channels of the preferred channel line-up in a preferred order on a display associated with the processor, monitoring a location of the processor while displaying the preferred channel line-up, determining whether the location of the processor corresponds to a channel exclusion zone, and removing excluded channels from the channel line-up based on the channel exclusion zone.

One or more aspects of the subject disclosure include a media processor that includes a processing system including a processor and a memory that stores executable instructions that, when executed by the processing system, facilitate performance of operations that include receiving a channel line-up for an over-the-top media content system to be provided at equipment of a user, generating a preferred channel line-up containing a portion of the channel line-up based on a user profile of the equipment of the user, displaying the preferred channel line-up on a display device associated with the equipment of the user, monitoring a location of the equipment of the user while displaying the preferred channel line-up, determining whether the location of the equipment of the user corresponds to a channel exclusion zone, and removing excluded channels from the channel line-up based on the exclusion zone.

One or more aspects of the subject disclosure include a machine-readable storage medium with executable instructions that, when executed by a processing system including a processor, facilitate performance of operations including providing a channel line-up to equipment of a user, wherein the equipment of the user displays adjusts the channel line-up according to a user profile associated with the equipment of a user as a preferred channel line-up, wherein the preferred channel line-up includes a portion of the channel line-up and is presented on a display associated with the equipment of the user in a graphical user interface displaying individual channels of the preferred channel line-up in a customized order, monitoring a location of the equipment of the user while displaying the preferred channel line-up, determining whether the location of the processor corresponds to a channel exclusion zone, instructing the equipment of the user to exclude channels from the channel line-up based on the exclusion zone, monitoring a time at which the equipment of the user is displaying the preferred channel line-up, determining whether the time of the displaying corresponds to a time based list change, and instructing the equipment of the user to alter the preferred channel line-up based on the time based list change to include channels.

Figure 1:
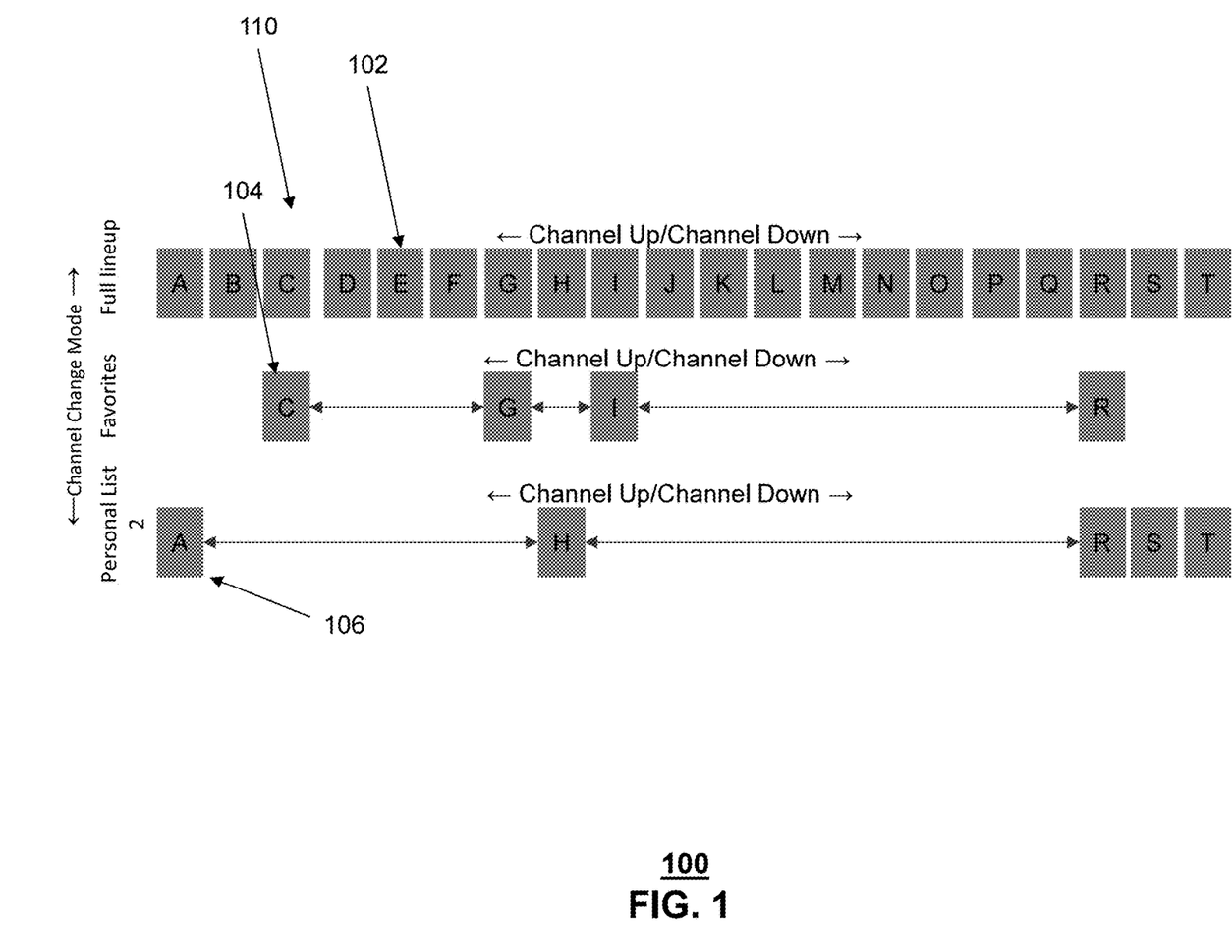
FIG. 1 depicts an illustrative embodiment of system 100.

FIG. 1 depicts an illustrative embodiment of system 100. System 100 illustrates an exemplary embodiment depicting the invention in which a main channel line-up 102 is illustrated in an interface 110. Exemplarily, interface 110 can be a graphical user interface provided on a device with an OTT application provided thereon to provide live channels provided by an OTT media content delivery system. Main channel line-up 102 illustrates an exemplary order of channels available in the OTT media content delivery system. Previously, users of the OTT media content delivery system would be required to browse through the channel line-up in alphabetical order, channel by channel. The channel list repeats itself as the user scrolls through the channels, going "ABCDEFGHIJKLMNOPQRST <-> ABCDEFGHI" again.

Favorites line-up 104 illustrates an exemplary embodiment of a favorite channel list for a user according to the invention. Exemplarily, the user has selected channels "CGIR" in which the scrolling list can be repeatedly scrolled through as "CGIRCGIR". Similarly, personal list 106 illustrates an exemplary embodiment of another channel list for a user, this time labelled as a "personal list" according to the invention. Exemplarily, the user has selected channels "AHRST" in which the scrolling list can be repeatedly scrolled through as "AHRSTAHRST".

Exemplary aspects of the invention can include methods of adjusting a channel change experience for any Live TV service to allow the user to toggle between different modes of channel changing. Exemplarily, customers can leverage a Favorite Channels concept applied to filter their electronic programming guide and apply it to their Channel Changes as well. When pulling in the list of channels to change through, a Client application will pull in the favorites list instead. This solution can be applied to multiple customized list that the customer can define. i.e. "Mom's List", "Dad's list", "Sports List", "News List", etc.

Exemplary embodiments of the invention can enhance a customer's ability to flip through their personalized list of channels allowing them to more easily find content that they would like to watch. Exemplary embodiments of the invention can include a method of adjusting the channel change experience for any Live TV service to allow the user to toggle between different modes of channel changing. Conventionally, a channel change requires a cycling through a complete list of channels that exist. Exemplary embodiments of the invention can allow the client application to pull in a client's favorites list instead. Exemplarily, a carousel format for channel cycling can be used.

Exemplarily, the customized channel lists can include temporal channel lists. Exemplarily, temporal channel lists, or a time based change list, can be customized per subscriber for different periods of time in the day and in the week. In additional embodiments, customized channel lists can be generated based on the capability of a current device. In some embodiments, it is determined that a current viewing device cannot present a certain channel due to technical limitations and restrict a customized channel list accordingly. In other examples, it can be determined that certain devices do not have subscription based access to a channel and the customized channel lists can be restricted accordingly for that device.

Exemplarily, the customized channel lists can be presented to the user or customized based on presence or location information. In some examples, lists may only be presented to the user based on an audience composition. For example, if the viewer is in the presence of children, adult type channels can be purged from a customized channel list presented to the user. Similarly, if it is determined that the user is in a public location, similar privacy considerations can take place. In further examples, a user may be at work and be automatically presented with a business themed preferred channel line-up that includes channels relevant for business, such as financial news channels.

Exemplarily, the system can present customized list based on the channels currently being viewed. In one example, the system may note channels that are frequently tuned to during a viewing session and create a list based on those frequent channels. In another example, the system may note channels that are frequently tuned to during a viewing session and create a list based on channels related to those frequent channels. In one example, viewing baseball games can result in a list being generated of each live baseball game available as well as channels that concurrently recap baseball and other sporting news.

Exemplarily, the customized channel lists can use personalized data to determine which customized channel list to present to a subscriber. In some embodiments, a user can have multiple lists to choose from. The user may have a first list that includes only news channels while a second list includes only sports channels. In addition, the users can have line-ups based on different viewing times and locations, as discussed above, as well as line-ups based on present company detected. Thus, parents can have a channel line-up for when they are watching OTT media content with their children and another for binging on regularly available content.

Figure 2:
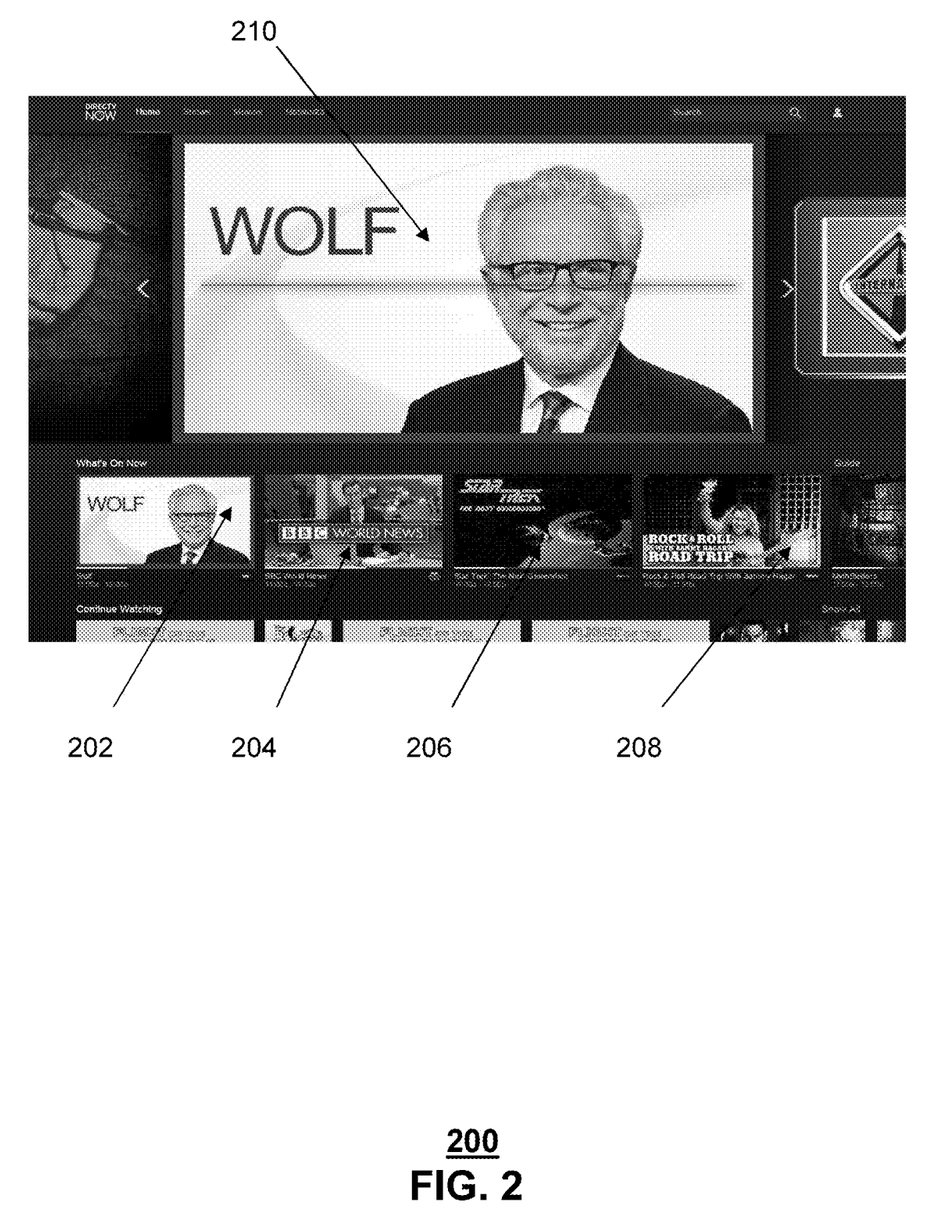
FIG. 2 depicts an illustrative embodiment of system 200.

FIG. 2 depicts an illustrative example of system 200. In an OTT media content delivery system, main window 210 shows a selected channel. In this example, the selected channel in the main window 210 is channel 202. In this example, the channels are arranged by the OTT media content delivery system in alphabetical order, contrary to the exemplary embodiment of system 100. In this example, channels 202, 204, 206, and 208 are arranged in alphabetical order and the user would have to scroll through the channels in this order.

Figure 3:
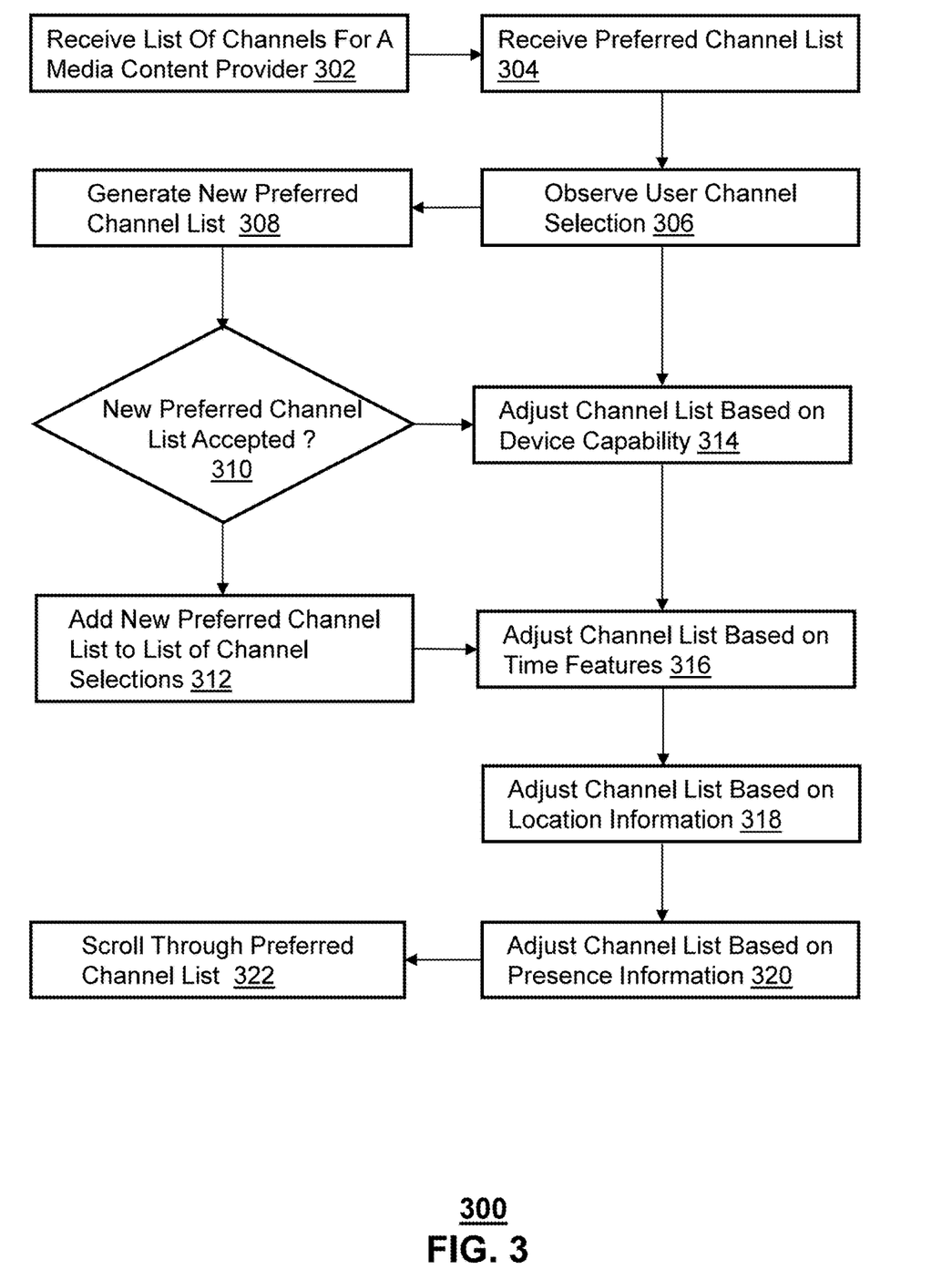
FIG. 3 depicts an illustrative embodiment of a method used in portions of the system described in FIG. 1.

FIG. 3 depicts an illustrative embodiment of a method 300 used by system 100. Method 300 can exemplarily begin in Step 302 in which a list of channels for a media content provider is acquired. Exemplarily, the list of channels is from an OTT media content provider. Exemplarily, in Step 304, a preferred channel list is received from a user at equipment of the user. The preferred channel list can be provided by accessing various menu functions and engaging in selections of which channels to add to a preferred channel list for a user.

Exemplarily, options included for creating one or more preferred channel lists for one or more users of the OTT media content provider can include lists for different subscribers and lists for different interests for each user or group of users. In another example, preferred channel lists can be based on various time constraints, such as preferred channel lists for weekdays and weekends as well as preferred channel lists for each day of the week. In other embodiments, method 300 can be used with tradition media content providers, such as cable service and interactive television media content providers.

In Step 306, the user's behavior can be monitored as the user views various OTT media content provider channels. Exemplarily, the user's frequently used channels can be ascertained. In other examples, various types of channels can be grouped together based on content. For example, if several sporting related channels are accessed with sufficient regularity, then in Step 308, a new preferred channel list for the user can be generated. In another embodiment, Step 308 can generate a new preferred channel list based on the user's ascertained frequently used channels. Exemplarily, new preferred channel lists or line-ups can be generated when a pattern is detected. In some examples, the pattern can be that certain talk shows are being watched or that certain sports programs are being watched.

In Step 310, this newly created list can be proposed to the user and if accepted by the user, a new preferred channel list based on the proposal is created for the user. In some examples, the user can have the new list added to a list of channel lists available to the user. In other examples, the new list can replace an older list of channels. Exemplarily, the replacement or update of the user's preferred channel lists can take place in Step 312.

Exemplarily, in Step 314, a preferred channel list for a user can be adjusted based on time constraints. Exemplarily, the time constraints can be selected by the user when engaged in the process of selecting preferred channels in Step 304. Exemplarily, the preferred channel lists can be updated based on a time of day or by the day of the week. For example, some users may watch financial or news based programming on their devices, in connection with an OTT media content provider, during business hours but prefer to watch 90's era sitcoms in nostalgia and syndication based channels in the hours after work and then choose family friendly channels in the hours around family time. Finally, the user may prefer a list of channels that include network television channels in the time period before bed.

Exemplarily, in Step 318, the preferred channel list for a user can be adjusted based upon a location of the user. In some embodiments, the user can view live television channels from an OTT media content provider on a mobile device while travelling. While traveling, the types of channels in the preferred channel list can change based on the location. For example, in a business setting, preferred channel list based on business appropriate channels, such as those discussed above for the time based business hours, can be provided. In addition, family friendly channels can be accessed while in a location where children or family members are likely to be gathered. Similarly, if the user is in a public location, the preferred channel list may be edited so as to avoid any embarrassing channels, such as an adult channel. In some examples, the user can set up channel exclusion zones where certain channel line-ups should not appears as options or where those channel line-ups require additional steps to access. In other embodiments, the OTT media content service provider can define channel exclusion zones based on similar methodology, contract and subscription issues, or because of black-out zones.

Similarly, in Step 320, presence information can be used to adjust the preferred channel list for the user. Presence information can detect additional viewers of the device at which the OTT media content provider television feeds are being accessed. Thus, in some examples, the presence of children can engage family friendly preferred channel lists while the presence of business associates can engage business style preferred channel lists.

In Step 322, the exemplary use of the preferred channel lists can take place in which television channels of an OTT media content provider can be scrolled through using the preferred channel lists for the user without having to engage in a channel by channel change of channels. Exemplarily, the scrolling can be in a side to side manner, a carousel, alphabetically, by last channel viewed, or by a most recent history of channels.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
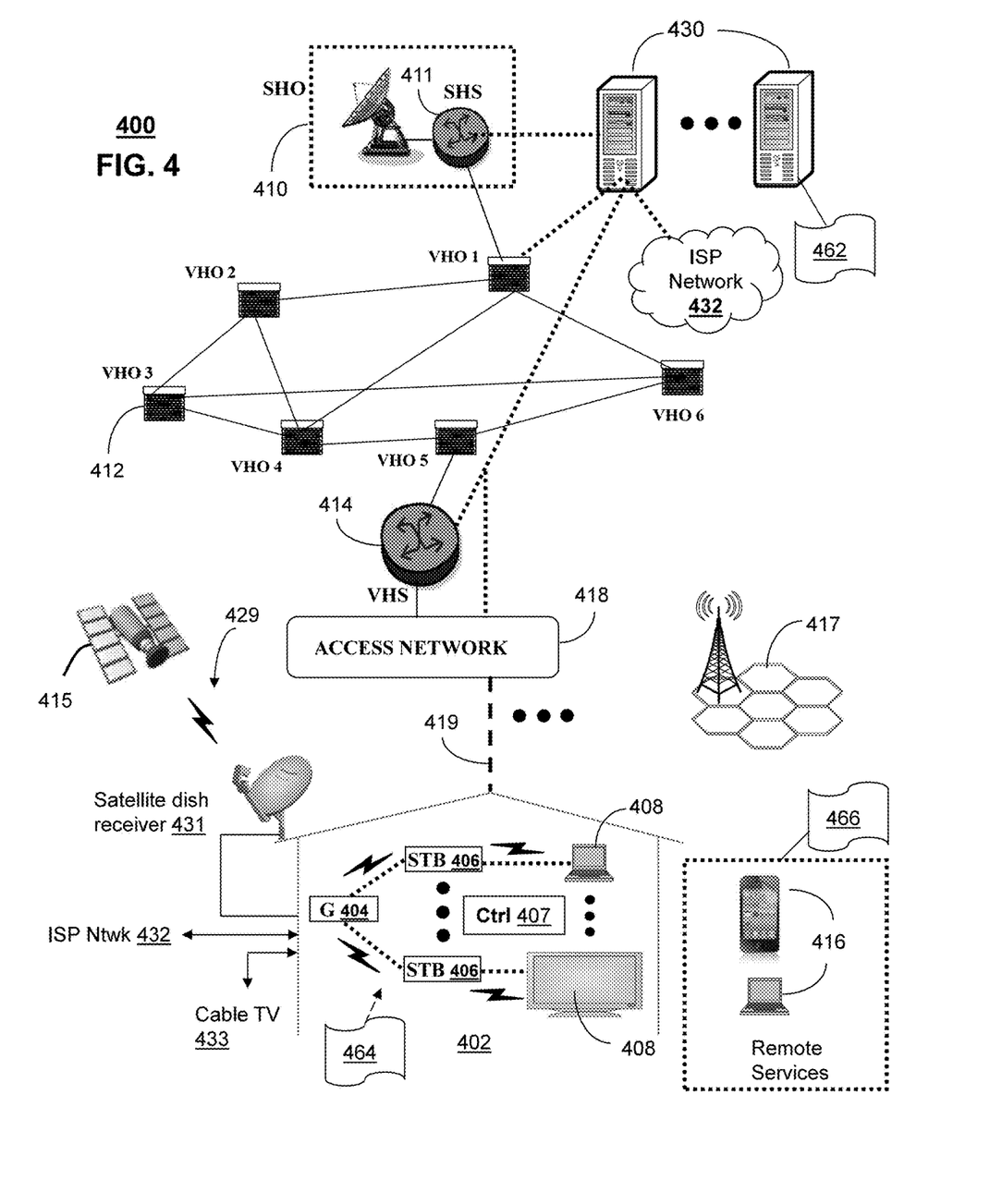
FIG. 4 depict illustrative embodiments of communication systems that provide media services to system 100 of FIG. 1.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with [refer to system 100 of FIG. 1 as another representative embodiment of communication system 400. For instance, one or more devices illustrated in the communication system 400 of FIG. 4 can perform a method that includes receiving a channel line-up for an over-the-top media content system, receiving a preferred channel line-up containing a portion of the channel line-up, displaying individual channels of the channels of the preferred channel line-up in a preferred order on a display associated with the processor, monitoring a location of the processor while displaying the preferred channel line-up, determining whether the location of the processor corresponds to a channel exclusion zone, and removing excluded channels from the channel line-up based on the channel exclusion zone.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an OTT media content provider (herein referred to as OTT server 430). The OTT server 430 can use computing and communication technology to perform live television services 462, which can include among other things, the creation of customized channels for OTT media content recipients as describe in method 300 of FIG. 3. For instance, live television services 462 of OTT server 430 can be similar to the functions described for servers that provide the media content and channel line-up of FIG. 1 in accordance with method 300. The media processors 406 and wireless communication devices 416 can be provisioned with software functions 464 and 466, respectively, to utilize the services of OTT server 430. For instance, functions 464 and 466 of media processors 406 and wireless communication devices 416 can be similar to the functions described for the interface 110 depicted in FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
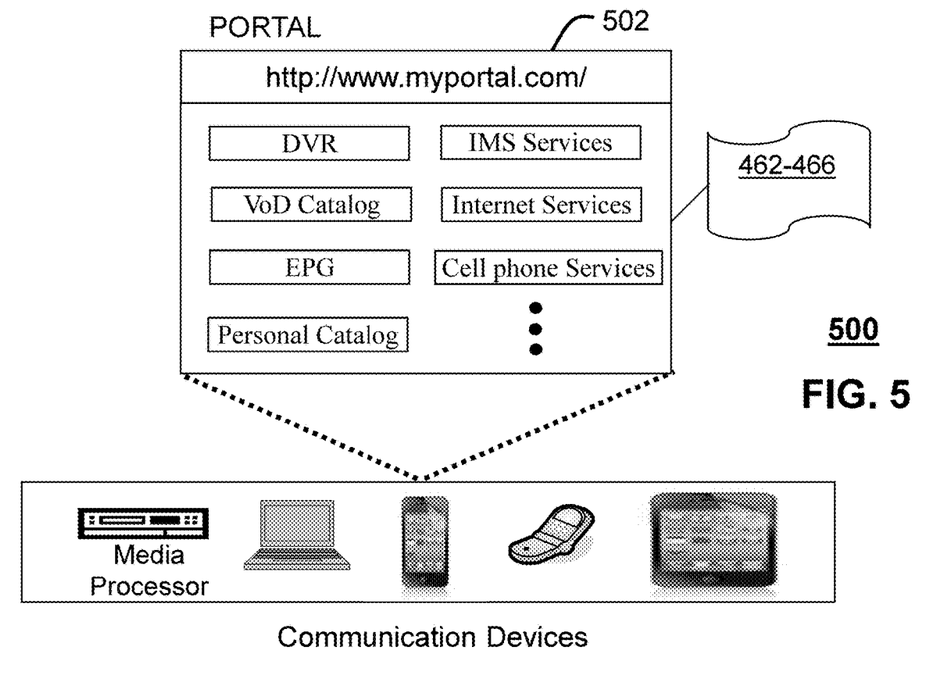
FIG. 5 depicts an illustrative embodiment of a web portal for interacting with the communication systems of system 100 and method 300 of FIGS. 1 and 3, respectively.

FIG. 5 depicts an illustrative embodiment of a web portal 502 of a communication system 500. Communication system 500 can be overlaid or operably coupled with system 100 and communication system 400 as another representative embodiment of system 100 of FIG. 1 and communication system 400. The web portal 502 can be used for managing services of system 100 of FIG. 1 and communication systems 400. A web page of the web portal 502 can be accessed by a Uniform Resource Locator (URL) with an Internet browser using an Internet-capable communication device such as those described in FIG. 1 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 464 and 466 to adapt these applications as may be desired by subscribers and/or service providers of system 100 of FIG. 1 and communication system 400. For instance, subscribers of the OTT server 430 can log into their on-line accounts and provision the servers 110 or server 430 with the necessary OTT media content applications and software to watch live streaming content from the OTT media content delivery system, and so on. Service providers can log onto an administrator account to provision, monitor and/or maintain the system 100 of FIG. 1 or server 430.

Figure 6:
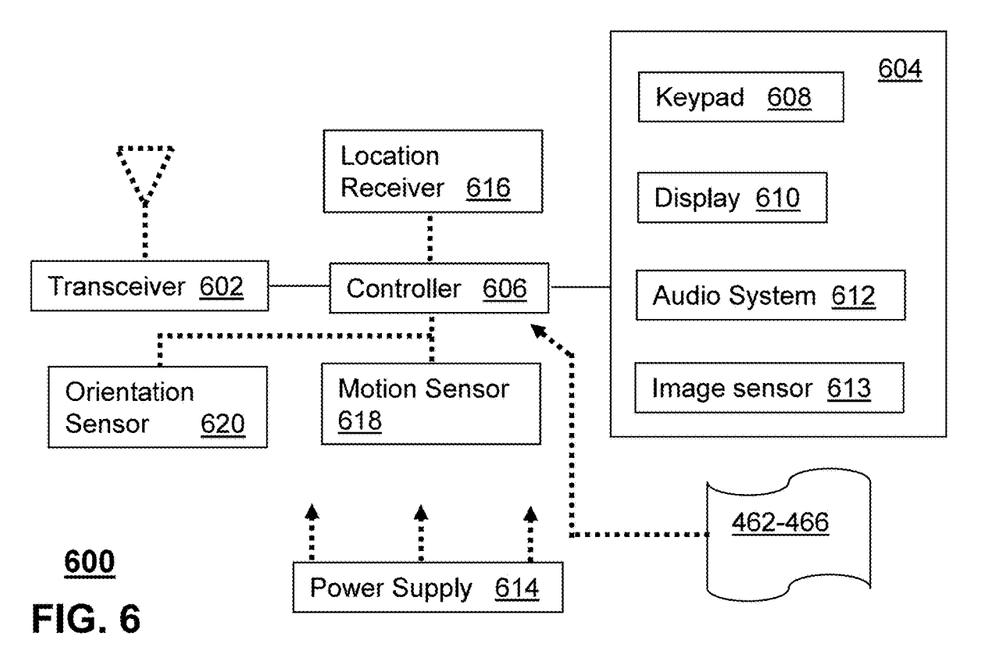
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIG. 4 and can be configured to perform portions of method 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of system 100 of FIG. 1, the media processor 406, the media devices 408, or the portable communication devices 416 of FIG. 4. It will be appreciated that the communication device 600 can also represent other devices that can operate system 100 of FIG. 1, communication system 400 of FIG. 4 such as a gaming console and a media player. In addition, the controller 606 can be adapted in various embodiments to perform the functions 464 and 466, respectively.

Upon reviewing the aforementioned embodiments, it would be evident to an artisan with ordinary skill in the art that said embodiments can be modified, reduced, or enhanced without departing from the scope of the claims described below. For example, the OTT media content delivery system can monitor the user device to ensure that some channels remain in the preferred channel line-up. In other embodiments, the OTT media content delivery system can monitor the time, location, and presence information of the computing device performing the playback of the live broadcast media content to ensure that a proper preferred channel line-up is being used for a respective situation.

In other embodiments, the OTT media content delivery system can monitor or the OTT application can monitor the capabilities of the user device presenting the OTT service to ensure that channels in the preferred line-up are within the capabilities of the device or to ensure that channels in the preferred channel line-up are only those that can take advantage of the best viewing options on the device. In other embodiments, multiple preferred channel line-ups can be stored for multiple users associated with an OTT media content subscription or the device. In some embodiments, the device can use presence information to present an appropriate channel line-up for whichever viewer is currently viewing the device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
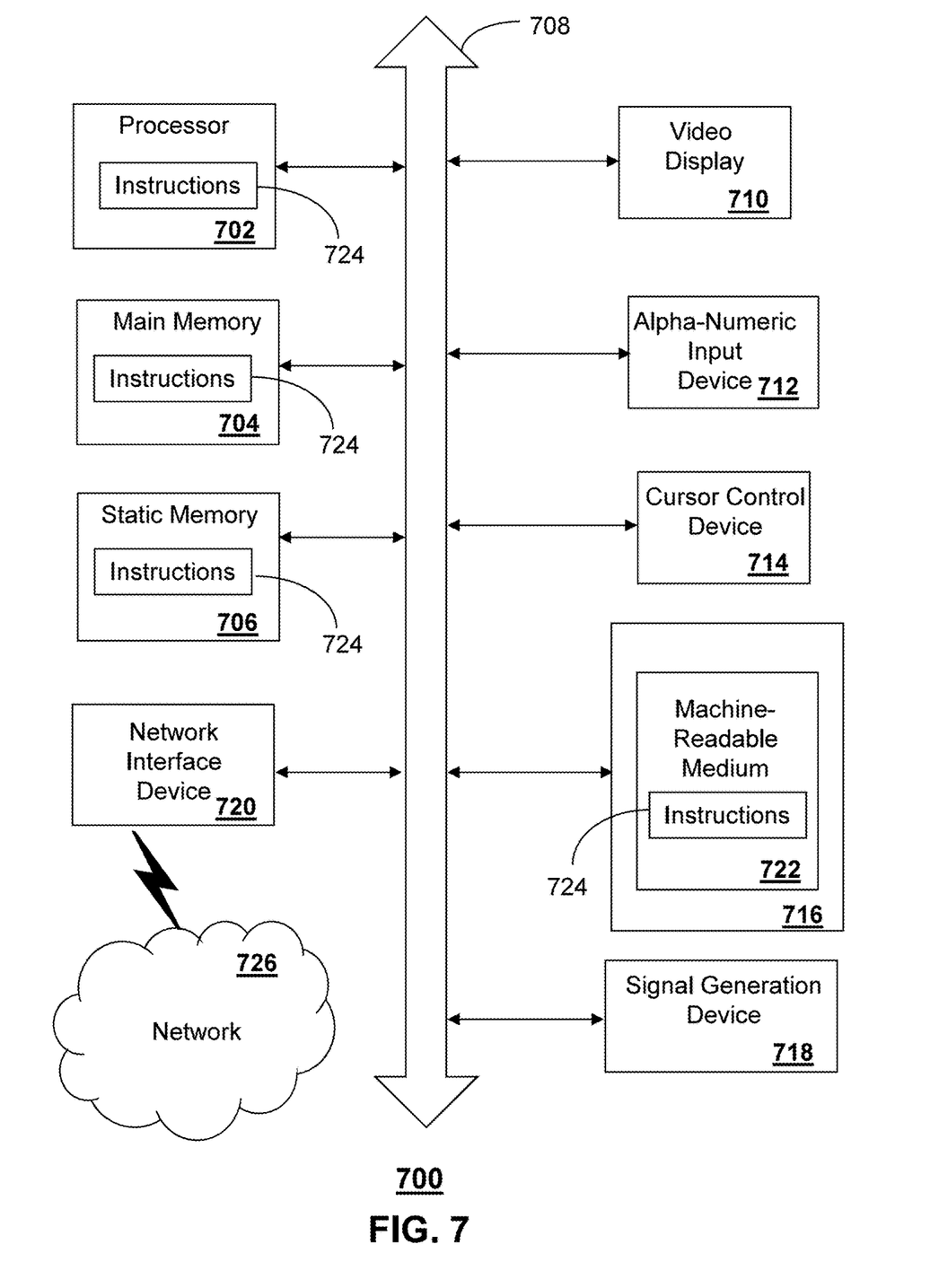
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, in the devices of the invention, for example, as the OTT server 430, the media processor 406, and the OTT media content playback devices associated with the OTT server 430 and other devices of FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

determining, by a processing system including a processor, whether a location of the processing system corresponds to a first channel exclusion zone that includes a public location, wherein first excluded channels associated with the first channel exclusion zone are specified by a first user of the processing system, and wherein the location of the processing system is identified via a location receiver;

determining, by the processing system, whether the location of the processing system corresponds to a second channel exclusion zone, wherein second excluded channels associated with the second channel exclusion zone are specified by a media content service provider, wherein the second excluded channels are defined based on: a contract or a subscription, a black-out zone, or any combination thereof, and wherein the second channel exclusion zone is different from the first channel exclusion zone in terms of location;

adjusting, by the processing system, a channel line-up of a graphical user interface by removing a first portion of the first excluded channels from the channel line-up based on the location of the processor corresponding to the first channel exclusion zone and retaining a second portion of the first excluded channels in the channel line-up based on the first user engaging in additional steps to retain access to the second portion of the first excluded channels via the channel line-up; and adjusting, by the processing system, the channel line-up by removing a first portion of the second excluded channels from the channel line-up based on the location of the processor corresponding to the second channel exclusion zone and retaining a second portion of the second excluded channels in the channel line-up based on the first user engaging in additional steps to retain access to the second portion of the second excluded channels via the channel line-up.

2. The method of claim 1, wherein the channel line-up is received from an over-the-top media content system.

3. The method of claim 1, wherein the channel line-up is configured to be presented in alphabetical order.

4. The method of claim 1, wherein the channel line-up is configured to be presented in a carousel arrangement.

5. The method of claim 1, further comprising:

providing, by the processing system, the graphical user interface including a plurality of channel line-ups; and receiving, by the processing system, a selection of the channel line-up from the plurality of channel line-ups.

6. The method of claim 1, further comprising:
monitoring, by the processing system, a time at which the channel line-up is being displayed.

7. The method of claim 6, further comprising:
determining, by the processing system, that the time corresponds to a time-based change list; and
changing, by the processing system, the channel line-up based on the determining that the time corresponds to the time-based change list.

8. The method of claim 1, wherein channels included in the channel line-up are based on a channel list for a second user, and wherein the first user and the second user are included in a group of users.

9. The method of claim 1, wherein channels included in the channel line-up are based on a content of each of the channels included in the channel line-up.

10. The method of claim 9, wherein the content includes sporting content.

11. The method of claim 1, further comprising:
generating, by the processing system, the channel line-up based on a detection of a pattern in terms of a type of a type of programming consumed by the first user.

12. The method of claim 11, wherein the type of programming corresponds to talk shows.

13. The method of claim 11, further comprising:
proposing, by the processing system, the channel line-up to the first user based on the generating of the channel line-up;
receiving, by the processing system, an acceptance from the first user based on the proposing; and
adding, by the processing system and based on the receiving of the acceptance, the channel line-up to a list of channel lists available to the first user.

14. The method of claim 13, wherein the adding of the channel line-up to the list of channel lists comprises replacing a second channel line-up in the list of channel lists with the channel line-up.

15. The method of claim 1, further comprising:
detecting, by the processing system, a presence of a child; and
changing, by the processing system and based on the detecting of the presence of the child, a displayed channel line-up from the channel line-up to a second channel line-up.

16. The method of claim 1, further comprising:
receiving, by the processing system, a first selection from the first user of a first channel;
receiving, by the processing system, a second selection from the first user of a second channel;
incorporating, by the processing system, the first channel and the second channel as part of the channel line-up based on the receiving of the first selection and the receiving of the second selection;
receiving, by the processing system, a third selection from a second user of a third channel; and
incorporating, by the processing system, the third channel as part of a second channel line-up based on the receiving of the third selection.

17. A device, comprising:
a processing system including a processor; and
a memory that stores executable instructions that, when executed by the processing system, facilitate performance of operations, the operations comprising:
determining whether a location of the processing system corresponds to a first channel exclusion zone, wherein first excluded channels associated with the first channel exclusion zone are specified by a first user of the processing system, and wherein the location of the processing system is identified via a location receiver;
determining whether the location of the processing system corresponds to a second channel exclusion zone, wherein second excluded channels associated with the second channel exclusion zone are specified by a media content service provider, wherein the second excluded channels are defined based on: a contract or a subscription, a black-out zone, or any combination thereof, and wherein the second channel exclusion zone is different from the first channel exclusion zone in terms of location;
adjusting a channel line-up of a graphical user interface by removing a first portion of the first excluded channels from the channel line-up based on the location of the processor corresponding to the first channel exclusion zone and retaining a second portion of the first excluded channels in the channel line-up based on the first user engaging in additional steps to retain access to the second portion of the first excluded channels via the channel line-up; and
adjusting the channel line-up by removing a first portion of the second excluded channels from the channel line-up based on the location of the processor corresponding to the second channel exclusion zone.

18. The device of claim 17, wherein the operations further comprise:
retaining a second portion of the second excluded channels in the channel line-up based on the location of the processor corresponding to the second channel exclusion zone and based on the first user engaging in additional steps to retain access to the second portion of the second excluded channels via the channel line-up.

19. A non-transitory, machine-readable storage medium, comprising executable instructions that, when executed by a processing system including a processor, facilitate performance of operations, the operations comprising:
determining whether a location of the processing system corresponds to a first channel exclusion zone that includes a public location, wherein first excluded channels associated with the first channel exclusion zone are specified by a first user of the processing system, and wherein the location of the processing system is identified via a location receiver;
determining whether the location of the processing system corresponds to a second channel exclusion zone, wherein second excluded channels associated with the second channel exclusion zone are specified by a media content service provider, wherein the second excluded channels are defined based on: a contract or a subscription, a black-out zone, or any combination thereof, and wherein the second channel exclusion zone is different from the first channel exclusion zone in terms of location;
adjusting a channel line-up of a graphical user interface to generate a first adjusted channel line-up by removing a first portion of the first excluded channels from the channel line-up based on the location of the processor corresponding to the first channel exclusion zone; and
adjusting the channel line-up to generate a second adjusted channel line-up by removing a first portion of the second excluded channels from the channel line-up based on the location of the processor corresponding to the second channel exclusion zone and retaining a second portion of the second excluded channels in the channel line-up based on the first user engaging in additional steps to retain access to the second portion of the second excluded channels via the channel line-up.

20. The non-transitory, machine-readable storage medium of claim 19, wherein the operations further comprise:
adjusting the first adjusted channel line-up to generate a third adjusted channel line-up based on a determination that a display of the processing system cannot present a certain channel of the first adjusted channel line-up; and presenting the third adjusted channel line-up.

* * * * *